United States Patent [19]

Panthofer

[11] Patent Number: 5,435,968
[45] Date of Patent: Jul. 25, 1995

[54] A LEAD-FREE SOLDER COMPOSITION

[75] Inventor: Robert E. Panthofer, Cedarburg, Wis.

[73] Assignee: Touchstone, Inc., Jackson, Tenn.

[21] Appl. No.: 185,114

[22] Filed: Jan. 21, 1994

[51] Int. Cl.⁶ .............................................. C22C 13/00
[52] U.S. Cl. ..................................... 420/561; 420/559; 420/560; 148/400; 148/405
[58] Field of Search .................... 420/589, 560, 561; 148/400, 405; C22C 13/00

[56] References Cited

U.S. PATENT DOCUMENTS

| | | | |
|---|---|---|---|
| 4,693,501 | 9/1987 | Logsdon, Jr. et al. | 285/173 |
| 4,739,630 | 4/1988 | Tandeski et al. | 62/354 |
| 4,758,407 | 7/1988 | Ballentine et al. | 420/560 |
| 4,817,857 | 4/1989 | Hargrove et al. | 228/183 |
| 4,879,096 | 11/1989 | Naton | 420/561 |
| 4,935,076 | 6/1990 | Yamaguchi et al. | 148/433 |
| 5,102,748 | 4/1992 | Wylam et al. | 420/560 |

Primary Examiner—David A. Simmons
Assistant Examiner—Sean Vincent
Attorney, Agent, or Firm—Head & Johnson

[57] ABSTRACT

An enhanced bonding design utilizing tin and copper to create tin alloy solders for use in the manufacturing of heat exchangers and other soldering applications. The tin alloy solders contain as primary constituent metals 3.0–15.0 wt. % copper and 79.0–97.0 wt. % tin, and containing as optional constituent metals 0.0–4.0 wt. % silver, 0.0–1.0 wt. % selenium and 0.0–1.0 wt. % bismuth. These solder alloys have lower toxicity levels and better corrosion resistance than the lead based alloy solders commonly employed. Also, because the application temperature range for these solder alloys is below the temperature where dezincification of copper/zinc base metal alloys occurs, joints on copper/zinc base metals subjected to cyclic loads are stronger when constructed using these tin alloy solders than when constructed of lead based alloy solders.

5 Claims, No Drawings

A LEAD-FREE SOLDER COMPOSITION

BACKGROUND OF THE INVENTION

1. Field Of The Invention

The present invention relates to alloy solders comprised of tin and copper that also may contain small amounts of silver, selenium and/or bismuth. These tin alloy solders can be utilized in applications where low toxicity, low application temperatures and high solder strength under cyclic load conditions are important, such as in heat exchanger construction and in electrical circuitry connections.

2. The Prior Art

Currently, lead based alloy solders are used almost exclusively for connecting tubes to header plates in the construction of heat exchangers. Normally, the tubes and header plates used in constructing heat exchangers are comprised of copper and zinc alloys, i.e. brass. When fluids used in heat exchangers contact the joints and seals created from the lead solder, the lead solder undergoes a chemical reaction or "bloom". This "bloom" is a result of chemical decomposition of the lead solder that increases when the fluids are not properly treated with the proper corrosion inhibitors. Lead from this decomposition will contaminate those fluids coming into contact with the lead solder. In addition, byproducts of the decomposition may cause plugging of heat exchanger tubes and will eventually weaken the joints and seals formed by the lead solder, causing them to fail.

The present invention addresses these problems by employing tin alloy solders comprised of tin and copper and that may contain small amounts of silver, selenium and/or bismuth. The tin solders of the present invention are not as susceptible to corrosion as are lead based solders. Also, because the tin solders contain no lead, they are less toxic to manufacture and to use than are lead based solders and, therefore, are also less costly than lead based solders from the standpoints of health protection and environmental compliance. Another advantage of the tin solders is that they are lighter in weight than lead based solders, thus reducing raw material shipping costs and product distribution costs. These cost reductions help offset the higher material costs for the metals that comprise the tin alloy solders.

Another problem with prior art joining welding is that, due to their higher application temperatures, they cause dezincification in the base metals, usually copper/zinc alloys. Dezincification occurs where the composition of the base metal is altered in the vicinity of where welding occurs. This happens because the zinc concentration in this area is decreased as a result of the zinc contained in the base metal alloy becoming liquified and moving away from the area of the solder prior to the liquefaction of the other components of the base metal alloy. Weakened solder joints result when dezincification of the base metals occurs.

By having a lower application temperature, the solder of the present invention avoids dezincification of base metals resulting in increased fatigue strengths, a feature especially important in applications involving cyclic loads of both thermal and vibrational natures. For example, when the solder of the present invention is used to construct heat exchangers, tube-to-header joint fatigue strengths are increased from 10 to 30 times over conventional lead solders, while tank-to-header plate fatigue strengths are increased 10 to 25 times over that of lead solders.

U.S. Pat. No. 4,758,407 reveals a lead-free, tin based solder composition for use in plumping applications for joining copper tubes and brass pipe and fittings. That invention is designed for applications where the solder is exposed to potable water and is designed so that the solder will not contaminate the water with lead, a known human toxin.

U.S. Pat. No. 4,758,407 includes claims for solder compositions including tin, copper, and silver. However, in addition to these three metals, each of the compositions revealed in U.S. Pat. No. 4,758,407 include either antimony or nickel or both antimony and nickel as additional components. The present invention includes tin and copper and optionally silver, but it does not include either antimony or nickel as additional components. Instead, selenium and/or bismuth are optionally added to the other metals to form the lead-free metal solder of the present invention. It would not be obvious to someone familiar with this area of art to eliminate the components of nickel and antimony from the alloy of U.S. Pat. No. 4,758,407 and add instead silver, selenium and/or bismuth.

SUMMARY OF THE INVENTION

The present invention is a lead-free metal alloy solder comprised by weight of 79.0–97% tin and 3.0–15.0% copper. The solder of the present invention preferably may also contain 0.0–4.0% silver, 0.0–1.0% selenium and/or 0.0–1.0% bismuth.

DETAILED DESCRIPTION OF THE PREFERRED EMBODIMENTS

The present invention is a new composition of lead-free alloy solder composed of tin and copper as the primary constituent metals. The weight percent of tin and copper will vary with the particular formulation but will be in the range of 79.0–97.0% tin and 3.0–15.0% copper. Although formulations of the present invention may be composed of only tin and copper, other formulations of the invention may contain silver, selenium and/or bismuth as optional constituent metals.

Tin solder is more ductile than lead solder. Therefore, optional constituent metals may be added to the tin and copper to form a tin alloy with increased strength. Silver is one optional constituent metal used for this purpose. In addition to increasing the strength of the tin solder, silver also enhances the corrosion resistance and flowability of the solder.

A second optional constituent metal used to strengthen the tin alloy is selenium. Selenium is considered a detrimental component in lead solders because it causes lead solder to become brittle. However, when incorporated in the more ductile tin solder, selenium increases the solder's hardness and strength without making the solder brittle. Selenium also enhances the flowability of the tin solder.

A third optional constituent metal used to strengthen the tin alloy is bismuth. Similar to selenium, bismuth is a detrimental component in lead solders because of its embrittling effect. However, like selenium, when bismuth is incorporated in the tin solder, it increases the solder's hardness and strength without causing the solder to be brittle.

These three optional constituent metals, i.e. silver, selenium and bismuth, may be incorporated individually or in any combination with the tin and copper. Formulations employing one or more of these optional constituent metals will contain these metals in the following ranges of weight percentages: 0.0–4.0% silver, 0.0–1.0% selenium, and 0.0–1.0% bismuth.

EXAMPLE

One formulation employing only tin and copper is an alloy formed of the following weight percentages of constituent metals.

|  | Sn | Cu |
|---|---|---|
| Example 1 | 97.0 | 3.0 |

EXAMPLES 2 & 3

Two formulations employing silver in conjunction with tin and copper are alloys formed from the following weight percentages of constituent metals.

|  | Sn | Cu | Ag |
|---|---|---|---|
| Example 2 | 95.0 | 4.85 | 0.15 |
| Example 3 | 95.0 | 4.5 | 0.5 |

EXAMPLES 4 & 5

Two formulations employing both silver and selenium in conjunction with tin and copper are alloys formed from the following weight percentages of constituent metals.

|  | Sn | Cu | Ag | Se |
|---|---|---|---|---|
| Example 4 | 94.5 | 4.5 | 0.5 | 0.5 |
| Example 5 | 94.0 | 5.0 | 0.5 | 0.5 |

EXAMPLE 6

A formulation employing silver, selenium and bismuth in conjunction with tin and copper is an alloy formed from the following weight percentages of constituent metals.

|  | Sn | Cu | Ag | Se | Bi |
|---|---|---|---|---|---|
| Example 6 | 93.5 | 5.0 | 0.5 | 0.5 | 0.5 |

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A lead-free metal solder composition comprising by weight:
   79.0–97.0% tin;
   3.0–15.0% copper;
   0.5–1.0% selenium; and
   0.5–1.0% bismuth.

2. A lead-free metal solder according to claim 1 further comprising in the composition, silver not exceeding 4.0%.

3. A lead-free metal solder composition comprising by weight about:
   4.5% copper;
   0.5% bismuth; and
   0.5% selenium; and a balance of tin.

4. A lead-free metal solder according to claim 3 including about 0.5% silver.

5. A lead-free metal solder composition comprising by weight about:
   93.5% tin;
   5.0% copper;
   0.5% silver;
   0.5% selenium; and
   0.5% bismuth.

* * * * *